BISTABLE CIRCUIT USED TO DETECT INFORMATION FROM STORAGE MEDIA

Filed Aug. 26, 1964

INVENTOR.
LOUZELLE A. LUKE
BY Thomas J Nikolai
ATTORNEY

United States Patent Office 3,304,442
Patented Feb. 14, 1967

3,304,442
BISTABLE CIRCUIT USED TO DETECT INFORMATION FROM STORAGE MEDIA

Louzelle A. Luke, Coon Rapids, Minn., assignor to Sperry Rand Corporation, New York, N.Y., a corporation of Delaware Filed Aug. 26, 1964, Ser. No. 392,148
3 Claims. (Cl. 307—88.5)

This invention relates generally to means for detecting and decoding information outputs from a storage media such as a search memory and in particular relates to a practical design for a bistable electronic switch which presents a high or low impedance to an interrogating pulse propagated along a strip transmission line. The invention further contemplates a plurality of said circuits each of which is selectively settable to one of its operating states in accordance with information representing input signals.

This invention finds application in, and actually forms an integral part of, a search memory as used in a computer. A search memory is a device which determines wether a specific word of information is stored in memory and determines the address of the word if it is in memory. Such a search memory may be of the type contained in copending application of Keefer, Serial No. 19,833, filed April 4, 1960, now Patent No. 3,155,945, and assigned to the assignee of the instant invention or a further variation as described in the application of Joseph et al., Serial No. 191,547, filed May 1, 1962, and also assigned to the assignee of the instant invention. In general, a plurality of binary words or numbers, the values of which are unknown, are stored in memory registers with each bit in corresponding digit or bit order position. An external word to be searched for is compared with the words stored in the memory. If the search word is stored in memory, there will be an output from that word line and there will be no output from all other word lines. Generally this is the tecnique used in large memories.

The present invention is utilized in conjunction with the search memories as follows. A strip transmission line is constructed of but not limited to a metal such as copper to propagate a series of controlled pulses to their termination. Such strip-type transmission lines are well known in the art and technical data concerning them are found in Reference Data for Radio Engineers, 4th edition, "International Telephone and Telegraph Corp.," Stratford Press, New York, New York, 1956, pp. 595–600. Located along predetermined intervals of the strip line are a plurality of bistable elements which, depending upon their state, present either a high impedance or low impedance to the interrogating pulses. Each of these bistable elements is electrically connected to the output of a word line located in the search memory. As stated previously, when a search word is compared with the stored words in memory and a match is found, there will be an output from the word line connected to the match word in the memory. However, there will be no outputs from all the other word lines. Therefore, the plurality of bistable elements which are connected to the word lines can be used to monitor or sense the presence or absence of an output when the corresponding word lines are driven. One such type of an impedance state detector is disclosed in the application of Belcourt et al., Serial No. 238,622, filed November 9, 1962, and assigned to the assignee of the instant application. The present invention is an improvement over the device disclosed in the Belcourt et al. application in that the circuit is automatically reset and therefore provides a higher speed of operation. Further a minimum of hardware is required thus providing simplicity of design.

Thus it is an object of this invention to provide a bistable circuit which senses the state of an element in a memory.

It is a further object of this invention to provide a bistable circuit which detects and decodes information output from a storage media such as a search memory.

It is also an object of this invention to provide a means of detecting and decoding information output from a storage media at a very high speed of operation.

It is another object of this invention to provide a bistable detecting circuit which automatically resets itself to a predetermined state upon detecting the information output from the storage media.

These and other more detailed and specific objects and features will be disclosed in the course of the following specification, reference being had to the accompanying drawings in which.

Figures 1, 2, 3:
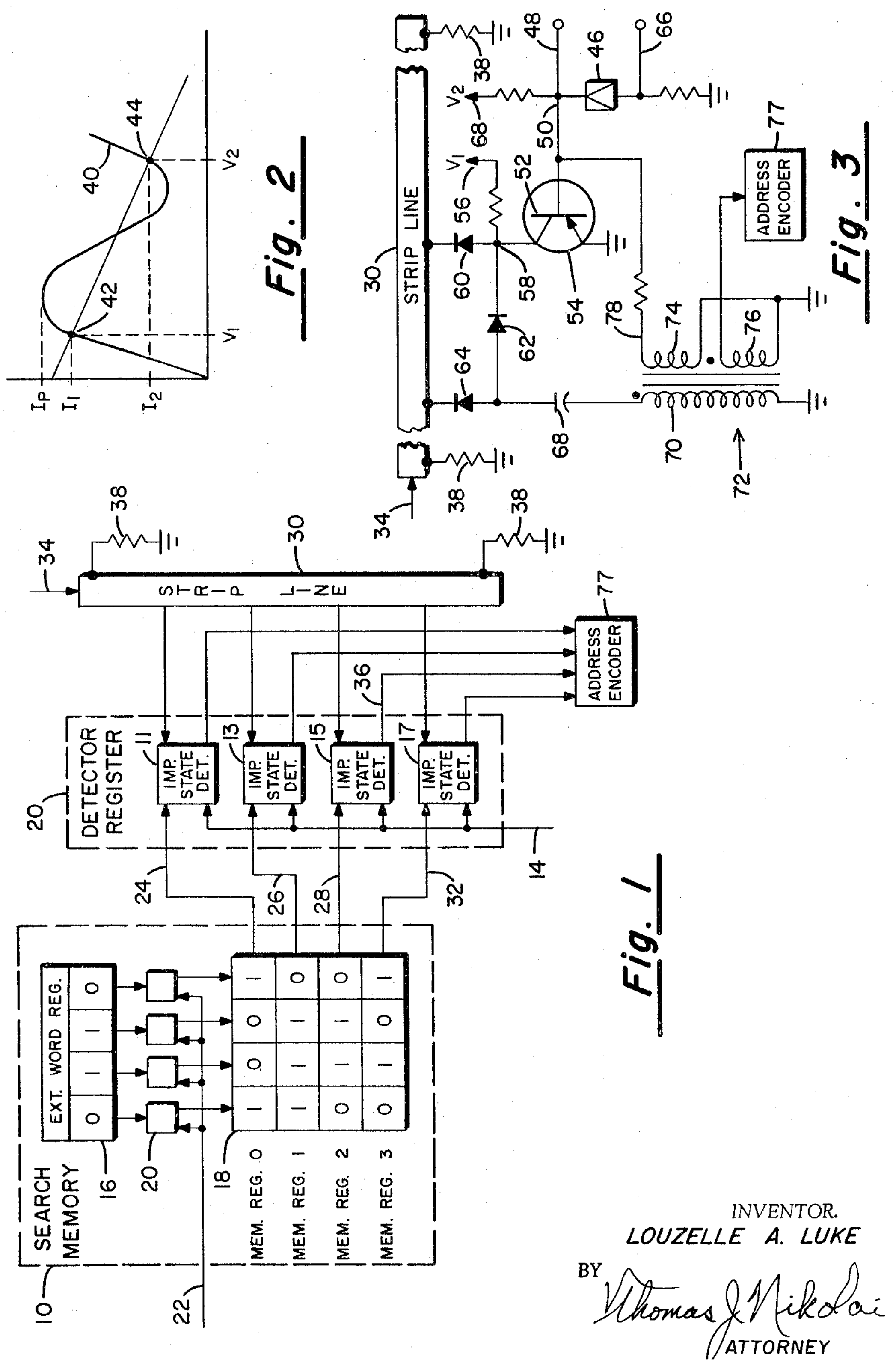
FIG. 1 is a general arrangement showing the connections between the impedance state detectors which form a register and the search memory.
FIG. 2 is a typical characteristic curve for a tunnel diode utilizable in the circuit of the embodiment shown in FIG. 3.
FIG. 3 is a detailed wiring diagram of the inventive impedance state detector.

The invention operates generally as follows. Each of the detector stages which is connected to the strip line is driven to the high impedance state by a master clear pulse. All stages therefore present a high impedance to any pulse which might be present on the strip line. The search memory is then interrogated to read out the information stored within the memory elements. As explained previously, word lines which match the search word will generate an output. These outputs are fed to their respective detector stages where they "set" the stage and cause it to present a low impedance to the strip line. Note that word lines which do not match the search word will not generate an output and therefore the stage associated with that line will continue to present a high impedance to the strip line. If an interrogating pulse is now applied to the strip line, it will by-pass each stage which presents a high impedance to the strip line but when it reaches a stage which presents a low impedance to the strip line, the pulse will be terminated since the low impedance of the stage presents essentially an A.C. ground to the interrogating pulse. The output of the transformer is not only sent to an address encoder which determines the address of the matching word in the memory but is also used to automatically reset the stage to its high impedance state in order that it might be ready for the next interrogating pulse. Thus, if more than one match is present, subsequent interrogating pulses will test the strip line for the remaining low impedance stages. If all stages are in their high impedance state, thus indicating no matches, the interrogating pulse will be terminated in the strip line characteristic impedance and will not be reflected back up the strip line.

While the above generalization describes the circuit and logic operations based on a concept that a "word match" will generate an output while a "no match" condition is detected by an absence of output it may be found advantageous in some instances to design a search memory such that the inverse concept holds true, i.e., a "no match" will generate an output while a "match" condition is detected by its absence of an output. The invention can still be implemented as previously described, however, with one minor modification. Prior to interrogating the word lines for output, the stages are all biased to present a low impedance to the strip line. Expanding on this concept then, the no match word which is detected by the output from the word line will set its associated stages thereby presenting a high impedance to the interrogating pulse. The absence of an output associated with the match word lines will serve to retain their respective stages in the low impedance state.

FIG. 1 discloses a detector register 20 coupled to a search memory 10 and a strip line 30. Each of the impedance state detectors 11, 13, 15 and 17 which form detector register 20 has a master clear pulse applied to it by way of line 14. This pulse causes each of the detectors to be set to its low impedance state, thus presenting a low impedance to the strip line 30. The search memory 10 includes an external word register 16 coupled to memory array 18 by way of gates 20. The external word register shown comprises four bits and each register of the memory array also comprises four bits. The number shown is merely for purpose of illustration and is not intended to be limiting. When it is desired to compare the words stored in the registers in the memory with the word in the external word register, a pulse is applied to gates 20 by way of line 22 which connects the outputs of each bit of the external word register to corresponding bits of each of the registers in the memory. As explained previously, if a match occurs between the word in the memory and the external word, a pulse is produced at the output of the memory register. In the example shown in FIG. 1 no match occurs between the word in the external word register and the word in memory register 0 and therefore no pulse will appear at the output of memory register 0 on line 24. Similarly, no pulse will appear at the output of memory register 1 on line 26 or at the output of memory register 3 on line 30. However, since the word stored in memory register 2 matches the external word, an output will appear on line 28 from memory register 2. The absence of a pulse on lines 24, 26 and 30 will cause their respective impedance state detectors 12 to remain set to their high impedance state. However, since a pulse is present on line 28, its impedance state detector will change to the low impedance state and present a low impedance to any pulse on strip line 30. Assume now that an interrogating pulse is supplied to the strip line 30 by way of line 34. Since the first impedance state detector is in a high impedance state because no pulse was applied to it on line 24, the interrogation pulse 34 will by-pass the first impedance state detector and continue down the strip line. The second impedance state detector is also in a high impedance state because no pulse was applied to it from memory register 1 on line 26. Therefore, the interrogating pulse will also by-pass this stage and continue down the strip line. The third impedance state detector is in the low impedance state since it has an input to it on line 28 which would cause it to change states from the low impedance to the high impedance state. Therefore, the interrogating pulse will be terminated by this stage. As wil be explained more fully hereinafter, the interrogation pulse upon entering the third impedance state detector 15 will cause an output to be produced on line 36 which will be sent to an address encoder wherein it will identify the memory register which has stored the word which correctly matches the word in the external word register. The interrogating pulse while in the third impedance state detector will also cause this stage to be reset to its high impedance state thus presenting a high impedance to the strip line 30. Since the fourth impedance state detector 17 also presented a high impedance to strip line 30, any subsequent interrogating pulse applied to strip line 30 by way of line 34 will now by-pass all four impedance state detectors 11, 13, 15 and 17 shown in FIG. 1 and will be terminated in the strip-line characteristic impedance 38.

In FIG. 2, curve 40 is the well known V–I characteristic curve for a typical tunnel diode. The V–I relationship is substantially linear from the origin as a positive signal input is applied to the anode of the tunnel diode until a peak curve, $I_p$ is reached and then the tunnel diode operates in its negative resistance region. The two points 42 and 44 on the characteristic curve corresponding respectively to $I_1V_1$ and $I_2V_2$ represent two operational states of the tunnel diode. Thus, the diode can operate stably in its low voltage state as indicated by intersection 42 or in its high voltage state as indicated by intersection 44. If it is assumed that the tunnel diode is quiescently biased to operate in its low voltage state as represented by operating point 42 in FIG. 2 and a positive input pulse is applied to the anode of the tunnel diode, the positive pulse causes forward current to flow through the tunnel diode. The amplitude of this pulse is sufficient to switch the diode operating point from 42 to an operating point 44 in the high voltage state. After the tunnel diode has switched to the high voltage state, its operating point stabilizes at intersection 44. If a positive pulse is now applied to the cathode of the tunnel diode it produces current flow in the tunnel diode in a reverse direction and causes it to switch its operating point from 44 to 42 in its low voltage state.

Consider now the circuit shown in FIG. 3. If a positive master clear pulse is applied to tunnel diode 46 via line 48, it will cause tunnel diode 46 to assume its low voltage state and junction 50 will be essentially at ground potential. This ground potential is applied to the base 52 of transistor 54 causing it to be turned off. Because transistor 54 is off, the full potential of negative voltage source 56 will appear at junction 58 thus back biasing diode 60. Because diode 62 is correctly poled, the negative potential at junction 58 will be passed through diode 62 back biasing diode 64 thus causing diodes 60 and 64 to present a high impedance to strip transmission line 30. The circuit now appears as an "open" to an interrogating signal propagated along the strip transmission line 30. The interrogating signal therefore is not affected by the circuit and will be terminated in its characteristic impedance 38.

Assume now that a positive pulse from a word line in the search memory appears on line 66. This positive pulse will cause tunnel diode 46 to switch from its low voltage state to the high voltage state thus causing point 50 to become essentially the potential of negative voltage source 68. This negative potential when applied to the base 52 of transistor 54 causes transistor 54 to go into conduction. When transistor 54 conducts, junction 58 becomes essentially ground potential thus forward biasing diodes 60 and 64 which present a low impedance to the strip line. If an interrogating pulse is now applied to strip line 30 by way of line 34, it will sense the low impedance and will be passed to ground by way of diode 64, coupling capacitor 68, and the primary winding 70 of transformer 72. The interrogating pulse is a negative pulse and with proper polarity of the transformer, a positive pulse will be induced in secondary reset winding 74 and output winding 76. The signal on output winding 76 will be sent to an address encoder 77 where it will be used to indicate that a match condition occurred. The output signal on winding 74 is applied by way of line 78 to the cathode of tunnel diode 46. This is a positive pulse which causes tunnel diode 46 to change from its high voltage to its low voltage state. As explained previously, in its low voltage state, tunnel diode 46 causes junction 50 to approach ground potential. This ground potential causes transistor 54 to be nonconductive. The negative potential at 56 then appears at junction 58 thus back biasing diodes 60 and 64 and causing them to present a high impedance to strip transmission line 30.

The reset time for the impedance state detector 12 cannot be less than the width of the interrogating pulse applied to strip line 30. The reason is that if the detector were reset to the high impedance state in a time shorter than the width of the interrogating pulse, it would present a high impedance to the remainder of the interrogating pulse allowing it to continue on down transmission line 30 thus acting as a false interrogating pulse to other impedance state detector stages further down the line.

Also, because diode 64, capacitor 68 and the primary winding of transformer 72 do not present an absolute short to ground but actually represent a small impedance to ground, a small voltage is developed from strip line 30 to ground. In effect the small resistance between the strip line and ground reduces the amplitude of the interrogation pulse considerably but does not completely destroy it. Therefore, the small remaining voltage continues down strip line 30 until it reaches diode 60. Since in the low impedance state transistor 54 is conducting and junction 58 is at ground potential the remainder of the voltage on strip line 30 is passed through diode 60 directly to the ground potential at junction 58 thus preventing the small voltage from traveling further down strip line 30.

In summary, prior to searching the memory for a word or words which comply with the search criteria, the detectors are "master cleared," i.e. all the circuits are set to their low voltage state, thereby presenting a high impedance to the strip line. The memory is then driven to read out information stored within the memory elements. Word lines which match the search criteria will generate an output to their respective detectors, setting the tunnel diodes therein to the high voltage state, which, as previously described, effects a low impedance to the strip line. Detectors not receiving an output will continue to exhibit a high impedance. An interrogating pulse is then applied to the strip line. This pulse, in passing through the first detector which is in a low impedance state, will induce a signal to the transformer address encoder winding which initiates an output to address generators which encode the address of the word in search memory that corresponds to the gated search word. Simultaneously the transformer reset winding in the impedance state detector is pulsed thus setting the tunnel diode which in turn switches the detector to the high impedance state. Thus, if more than one match were present, subsequent interrogating pulses will test the strip line for the remaining low impedance detectors. If all detectors were in the high impedance state, i.e., no matches, the interrogating pulse is terminated in the strip line characteristic impedance.

It is understood that suitable modifications may be made in the structure as disclosed provided such modifications come within the spirit and scope of the appended claims.

Having now, therefore, fully illustrated and described my invention what I claim to be new and desire to protect by Letters Patent is:

1. An impedance state detector comprising:
- a circuit including a transformer with an input and first and second output windings and a negative resistance element having first and second stable states,
- means coupled to said negative resistance element for setting it to the first of its two stable states,
- means for generating a signal representative of a first or a second condition,
- means coupling said signal to said negative resistance element to change it from said first stable state to said second stable state when said signal represents said first condition and to leave said negative resistance element in its first state when said signal represents said second condition,
- interrogating pulse means,
- means electrically coupled to said interrogating pulse means, said negative resistance element and said input transformer winding for coupling said interrogating pulse to said transformer input winding when said negative resistance element is in said second state only,
- means utilizing the signal on said first transformer output winding to indicate the condition of said signal generating means, and

- means coupling the signal on said second transformer output winding to said negative resistance element to reset said element to the first of its two stable states.

2. The detector of claim 1 wherein said electrical coupling means includes:
- first and second diodes each having an anode and a cathode,
- a capacitor,
- a transistor having a base, an emitter and a collector,
- means for electrically connecting said first diode, said capacitor and said transformer input winding in a series arrangement,
- means coupling said second diode between the collector of said transistor and the junction of said first diode and said capacitor,
- means for connecting the collector of said transistor to a first potential through a resistance,
- means for connecting the emitter of said transistor to a second potential and
- means for connecting the base of said transistor to said negative resistance element.

3. An impedance state detector comprising:
- a strip type transmission line terminated at each end in its characteristic impedance,
- first, second and third diodes each having an anode and a cathode,
- the cathodes of said first and second diodes being connected to said strip line in spaced apart relationship,
- a transistor having a base, an emitter and a collector,
- a transformer having an input winding and first and second output windings,
- a capacitor electrically coupled in serial arrangement with said transformer input winding,
- means connecting the anode of said third diode to said capacitor and the anode of said first diode,
- a first resistor,
- a first potential connected to one end of said first resistor,
- means coupling the other end of said resistor to the anode of said second diode, to the cathode of said third diode and to the collector of said transistor,
- a second resistor,
- a second potential connected to one end of said second resistor,
- a negative resistance element having first and second stable operational states,
- a first signal input for setting said negative resistance element to said first stable operational state,
- means coupling the other end of said second resistor to the base of said transistor, to said first output winding of said transformer, to said negative resistance element, and to said first signal input,
- a third potential connected to the emitter of said transistor,
- a second signal input coupled to said negative resistance element for changing the state of said element from said first to said second stable operational states, and
- means coupled to said winding of said transformer for indicating the state of said negative resistance element.

References Cited by the Examiner

UNITED STATES PATENTS

| | | | |
|---|---|---|---|
| 3,193,804 | 7/1965 | Perry et al. | 340—173 |
| 3,201,598 | 8/1965 | Pressman | 307—88.5 |

ARTHUR GAUSS, *Primary Examiner.*

J. JORDAN, *Assistant Examiner.*